(12) United States Patent
Hirabayashi et al.

(10) Patent No.: US 6,675,089 B2
(45) Date of Patent: Jan. 6, 2004

(54) MOBILE INFORMATION PROCESSING SYSTEM, MOBILE INFORMATION PROCESSING METHOD, AND STORAGE MEDIUM STORING MOBILE INFORMATION PROCESSING PROGRAM

(75) Inventors: Shigefumi Hirabayashi, Hiroshima (JP); Norihiko Uchida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/897,430

(22) Filed: Jul. 3, 2001

(65) Prior Publication Data

US 2002/0022923 A1 Feb. 21, 2002

(30) Foreign Application Priority Data

Jul. 5, 2000 (JP) ........................................ 2000-203742

(51) Int. Cl.[7] ............................................... G06F 17/60
(52) U.S. Cl. ........................ 701/200; 701/208; 701/213
(58) Field of Search .................................. 701/200, 204, 701/206, 208, 213, 117, 118, 119; 340/989, 990, 994, 995

(56) References Cited

FOREIGN PATENT DOCUMENTS

| EP | 0 638 887 | 2/1995 |
|----|-----------|--------|
| EP | 0 785 519 | 7/1997 |
| EP | 0 788 067 | 8/1997 |
| EP | 0 795 835 | 9/1997 |
| JP | 08-292786 | 11/1996 |
| JP | 09-061185 | 3/1997 |
| JP | 09-113599 | 5/1997 |
| JP | 11-86195  | 3/1999 |

*Primary Examiner*—Richard M. Camby
(74) *Attorney, Agent, or Firm*—Nixon Peabody LLP; Donald R. Studebaker

(57) ABSTRACT

In order to make better use of personal information manager data and to improve the convenience for the user, in cases where such personal information manager data is used in a vehicle V, the personal information manager data including position data and time data and traffic information are input from outside the vehicle V so as to guide the user using the vehicle V along a travel route based on the personal information manager data and in association with the position data, whereby it is possible to appropriately guide the user using the vehicle V along the travel route according to the position data of the personal information manager data.

11 Claims, 7 Drawing Sheets

MOBILE INFORMATION PROCESSING SYSTEM, MOBILE INFORMATION PROCESSING METHOD, AND STORAGE MEDIUM STORING MOBILE INFORMATION PROCESSING PROGRAM

BACKGROUND OF THE INVENTION

The present invention relates to a mobile information processing system, a mobile information processing method, and a storage medium storing a mobile information processing program, for guiding a mobile object along a travel route based on PIM (Personal Information Manager) data which has been input and set in advance, or for automatically updating the personal information manager data based on the traveling status of the mobile object.

In the prior art, Japanese Laid-Open Patent Publication No. 11-86195, for example, discloses a mobile information processing system of this type in which a navigation device combined with an electronic mail device is installed in a vehicle, so that a message indicating the position of the user's vehicle can be transmitted to an external mail server while electronic mail data from the external mail server can be received by the on-vehicle electronic mail device and displayed on a screen.

Possible types of information that may be handled when using a mobile object such as a vehicle include, in addition to electronic mail data as in the prior art, personal information manager data such as one's schedule. The personal information manager data can be either set in the mobile object or input from outside the mobile object to be stored in a memory, so that the data can be read out so as to be displayed or otherwise reported as necessary. This may be convenient for a traveling salesperson, for example, who can then easily check the travel schedule when the salesperson needs to travel around and visit different places one after another to attend meetings, etc.

In such a case, however, the personal information manager data is typically data that is obtained by inputting and setting schedule items. Simply displaying or reporting the data such as schedule items will not be so convenient in cases where the data is used in a mobile object.

An object of the present invention is to improve the method of processing personal information manager data in cases where the personal information manager data is used in a mobile object so as to make better use of the personal information manager data and to improve the convenience for the user.

SUMMARY OF THE INVENTION

In order to achieve the object described above, the present invention utilizes the fact that the position of a mobile object can be identified by navigation control for guiding the mobile object along a travel route, and uses the position data of the personal information manager data in association with the actual positions through which the mobile object travels, so as to guide, based on the position data and received traffic information, the mobile object along the travel route according to the position data of the personal information manager data, or to automatically update the personal information manager data based on the traveling status data of the mobile object guided along the travel route.

Specifically, a mobile information processing system of the present invention includes: a computer for setting personal information manager data including position data; and a navigation device for receiving traffic information and guiding a mobile object along a travel route, wherein the navigation device is configured so as to guide the mobile object along the travel route based on the personal information manager data which has been set through the computer and in association with the position data.

With this configuration, the personal information manager data including the position data is set through the computer. Based on the received traffic information and the personal information manager data, which has been set through the computer, the navigation device guides the mobile object along the travel route in association with the position data of the personal information manager data. Therefore, it is possible to appropriately guide the mobile object along the travel route according to the position data of the personal information manager data, which has been set through the computer, thereby improving the convenience for the user in cases where personal information manager data is used in a mobile object.

The computer is configured so as to set the personal information manager data in association with time data. The navigation device is preferably configured so as to determine whether the mobile object can arrive at a scheduled position by a scheduled time based on the time data and the position data which have been set through the computer and the traffic information, and to give a predetermined notification when it is determined that timely arrival is not possible.

In this way, when it is expected that the mobile object cannot arrive at the scheduled position by the scheduled time, the user can be notified, in advance, of the possibility of being late, whereby the user can more easily address the situation.

In such a case, the navigation device is configured so as to set a predetermined extra time when determining whether the mobile object can arrive at the scheduled position by the scheduled time. In this way, the user is given the extra time for addressing the situation.

The navigation device may be configured so as to give a notification either via calling by voice or via e-mail when it is determined that the mobile object cannot arrive at the scheduled position by the scheduled time. In this way, the user can suitably select the form of notification to be either calling by voice or e-mail depending upon the circumstances, thereby further improving the convenience for the user.

The navigation device may be configured to set an alternative travel schedule when it is determined that the mobile object cannot arrive at the scheduled position by the scheduled time. In this way, the mobile object may be able to arrive at the scheduled position by the scheduled time with the alternative travel schedule, thereby improving the convenience for the user.

The computer may be provided outside the mobile object and configured so as to transmit the personal information manager data which has been set through the computer to the navigation device. In this way, since the personal information manager data is set through the computer outside the mobile object to be transmitted to the navigation device, it is not necessary to set the personal information manager data in the mobile object, and it is only necessary to provide the navigation device in the vehicle, thereby simplifying the configuration of the system on the mobile object side.

In such a case, the computer may be configured so as to set a travel route of the mobile object and to transmit data of the travel route to the navigation device. In this way, since the travel route of the mobile object is set through the computer outside the mobile object, and the data of the travel route is transmitted to the navigation device, the navigation device no longer needs the function of setting the travel route of the mobile object, and only needs the function of guiding the mobile object along the travel route, thereby simplifying the navigation device.

The navigation device may be configured so that an item of the personal information manager data associated with a current navigation control operation is selected and reported by a predetermined switch operation. In this way, the user can know about the personal information manager data item associated with the current navigation control operation through a simple switch operation, thereby improving the convenience for the user.

The navigation device may be configured so as to update the traffic information stored therein by receiving current traffic information at regular intervals of a predetermined time period, or the navigation device may be configured so as to update the traffic information by receiving current traffic information in response to a switch operation. With these configurations, it is possible to appropriately set the timing at which to update the traffic information. Particularly, with the former configuration, the traffic information is updated periodically by receiving latest traffic information, and it is possible to perform navigation control according to the personal information manager data with a good precision.

Alternatively, a mobile information processing system of the present invention includes: a computer for setting personal information manager data including position data; and a navigation device for guiding a mobile object along a travel route and transmitting traveling status data of the mobile object, wherein the computer is configured so as to automatically update the personal information manager data based on the traveling status data of the mobile object transmitted from the navigation device.

With this configuration, the personal information manager data including the position data is set through the computer. The mobile object is guided along the travel route by the navigation device, and the traveling status data of the mobile object is transmitted from the navigation device to the computer. In the computer, to which the traveling status data of the mobile object has been transmitted, the personal information manager data is automatically updated based on the traveling status data of the mobile object. In this way, the personal information manager data on the computer is automatically updated according to the actual traveling status of the mobile object, and it is possible to appropriately update the personal information manager data, thereby improving the convenience for the user.

In such a case, the navigation device may be configured so as to transmit the traveling status data in association with time data, and the computer may be configured so as to automatically update the personal information manager data based on the traveling status data and the time data transmitted from the navigation device. In this way, it is possible to more appropriately update the personal information manager data on the computer.

The navigation device may be configured so as to receive the personal information manager data from the computer and to confirm, after the mobile object comes to a halt, whether or not to update an item of the personal information manager data corresponding to the halt state. In this way, the navigation device confirms, after the mobile object comes to a halt, whether or not to update an item of the personal information manager data received from the computer corresponding to the halt state, and it is possible to selectively update only the necessary items of the personal information manager data, thereby improving the convenience for the user.

Alternatively, a mobile information processing system of the present invention includes: a computer for inputting, in advance, personal information manager data including position data and time data; a mobile object positioning device for detecting a current position of a mobile object; a navigation device for receiving traffic information; a determination device for determining, based on the position data and the time data which have been input through the computer, the current position of the mobile object which has been detected by the mobile object positioning device, and the traffic information received by the navigation device, whether the mobile object can arrive at a position corresponding to the position data by a time corresponding to the time data in view of the traffic information; and a notification device for giving a predetermined notification when it is determined by the determination device that timely arrival is not possible.

With this configuration, the personal information manager data including the position data and the time data is input through the computer while the traffic information is received by the navigation device, and the current position of the mobile object is detected by the mobile object positioning device. Then, the determination device determines, based on the position data and the time data of the personal information manager data, the current position of the mobile object and the traffic information, whether the mobile object can arrive at the position corresponding to the position data by the time corresponding to the time data in view of the traffic information, and the notification device gives a predetermined notification when it is determined that timely arrival is not possible. Also in this case, when it is determined that the mobile object cannot arrive at the position corresponding to the position data by the time corresponding to the time data, the user can be notified, in advance, of the determination, whereby the user can easily address the situation.

A mobile information processing method of the present invention includes the step of guiding a mobile object along a travel route based on personal information manager data including position data and received traffic information and in association with the position data. Effects as those described above are also provided by this method.

Another mobile information processing method of the present invention includes the step of automatically updating personal information manager data including position data based on traveling status data which is obtained while guiding a mobile object along a travel route. Effects as those described above are also provided by this method.

Still another mobile information processing method of the present invention includes the steps of: inputting, in advance, personal information manager data including position data and time data; detecting a current position of a mobile object; receiving traffic information; determining, based on the position data and the time data which have been input, the detected current position of the mobile object, and the received traffic information, whether the mobile object can arrive at a position corresponding to the position data by a time corresponding to the time data in view of the traffic information; and giving a predetermined notification when it is determined that timely arrival is not possible. Effects as those described above are also provided by this method.

In such a case, a predetermined extra time is set when determining whether the mobile object can arrive at the position corresponding to the position data by the time corresponding to the time data. Effects as those described above are also provided by this method.

An alternative travel schedule is set when it is determined that the mobile object cannot arrive at the position corresponding to the position data by the time corresponding to the time data. Effects as those described above are also provided by this method.

A storage medium for storing a program for controlling a computer of the present invention is a storage medium storing a mobile information processing program for guiding a mobile object along a travel route based on personal information manager data including position data and received traffic information and in association with the position data. Effects as those described above are also provided by this storage medium.

Another such storage medium of the present invention is a storage medium storing a mobile information processing program for automatically updating personal information manager data including position data based on traveling status data which is obtained while guiding a mobile object along a travel route. Effects as those described above are also provided by this storage medium.

Still another storage medium of the present invention is a storage medium storing a mobile information processing program for determining, based on personal information manager data including position data and time data which have been input in advance, a detected current position of a mobile object, and received traffic information, whether the mobile object can arrive at a position corresponding to the position data by a time corresponding to the time data in view of the traffic information, and giving a predetermined notification when it is determined that timely arrival is not possible. Effects as those described above are also provided by this storage medium.

DETAILED DESCRIPTION OF THE INVENTION

Figure 1:
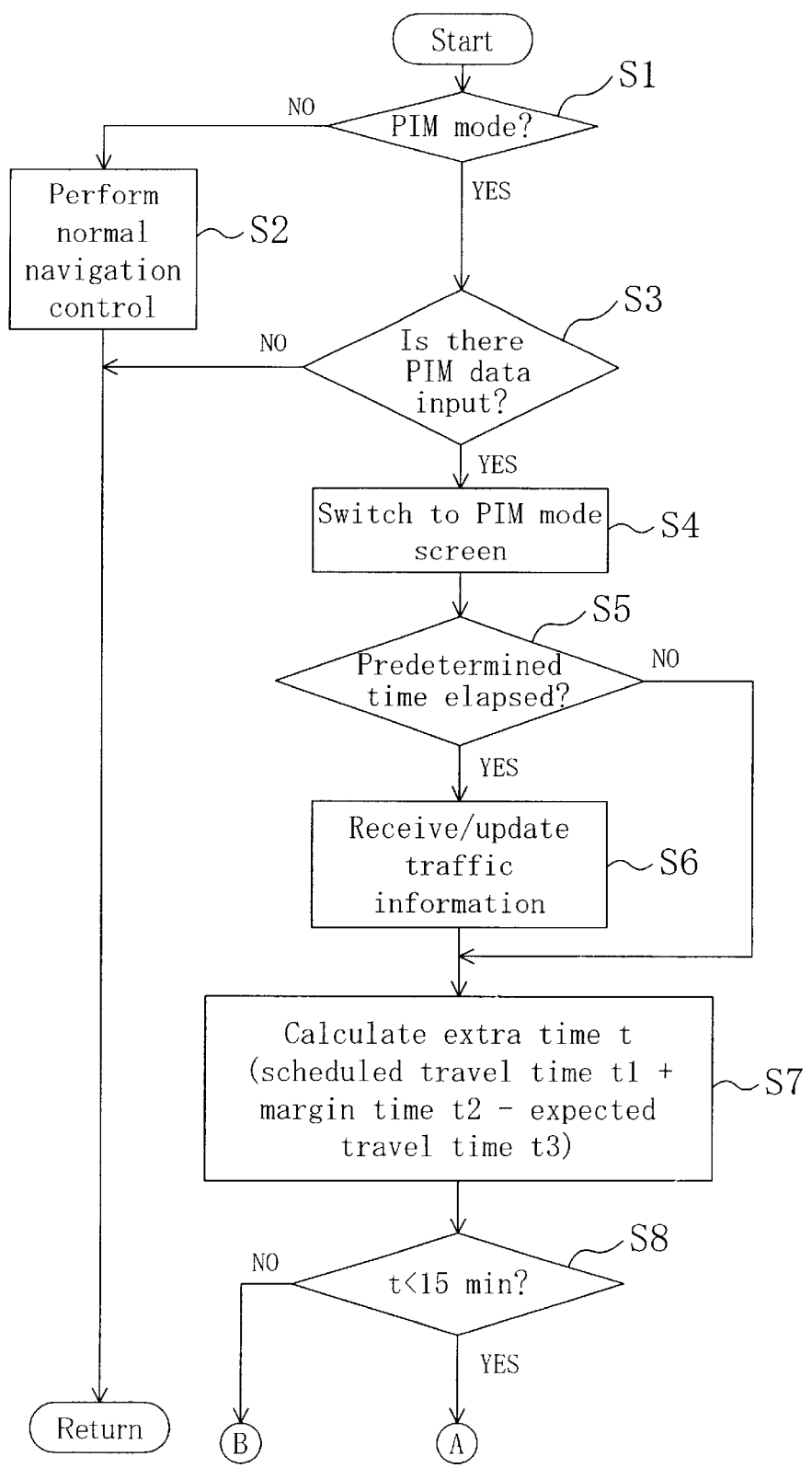
FIG. 1 is a flow chart illustrating the first half of a signal processing operation which is performed for navigation control in a CPU of an on-vehicle navigation device.

An embodiment of the present invention will now be described with reference to the accompanying drawings. FIG. 8 illustrates a general configuration of a mobile information processing system A according to an embodiment of the present invention. The mobile information processing system A includes a navigation device 1 installed in a vehicle V. The navigation device 1 is capable of exchanging data with personal computers 20 used by users (individuals), a server 30 (see FIG. 7) installed in a dedicated information center MC for providing various information, and another server (not shown) installed in a traffic information center TC for providing traffic information. Specifically, the information center MC and the personal computers 20 are connected to each other by a communication line 28, e.g., a telephone line. A radio communication antenna 31 is connected to the communication line 28, and signals are exchanged by radio wave via the radio communication antenna 31 between the personal computers 20/information center MC and the on-vehicle navigation device 1. On the other hand, a radio communication antenna 32 is connected to the traffic information center TC. Signals are exchanged by radio wave via the radio communication antenna 32 between the traffic information center TC and the navigation device 1, and traffic information is transmitted from the traffic information center TC to the navigation device 1.

Figure 5:
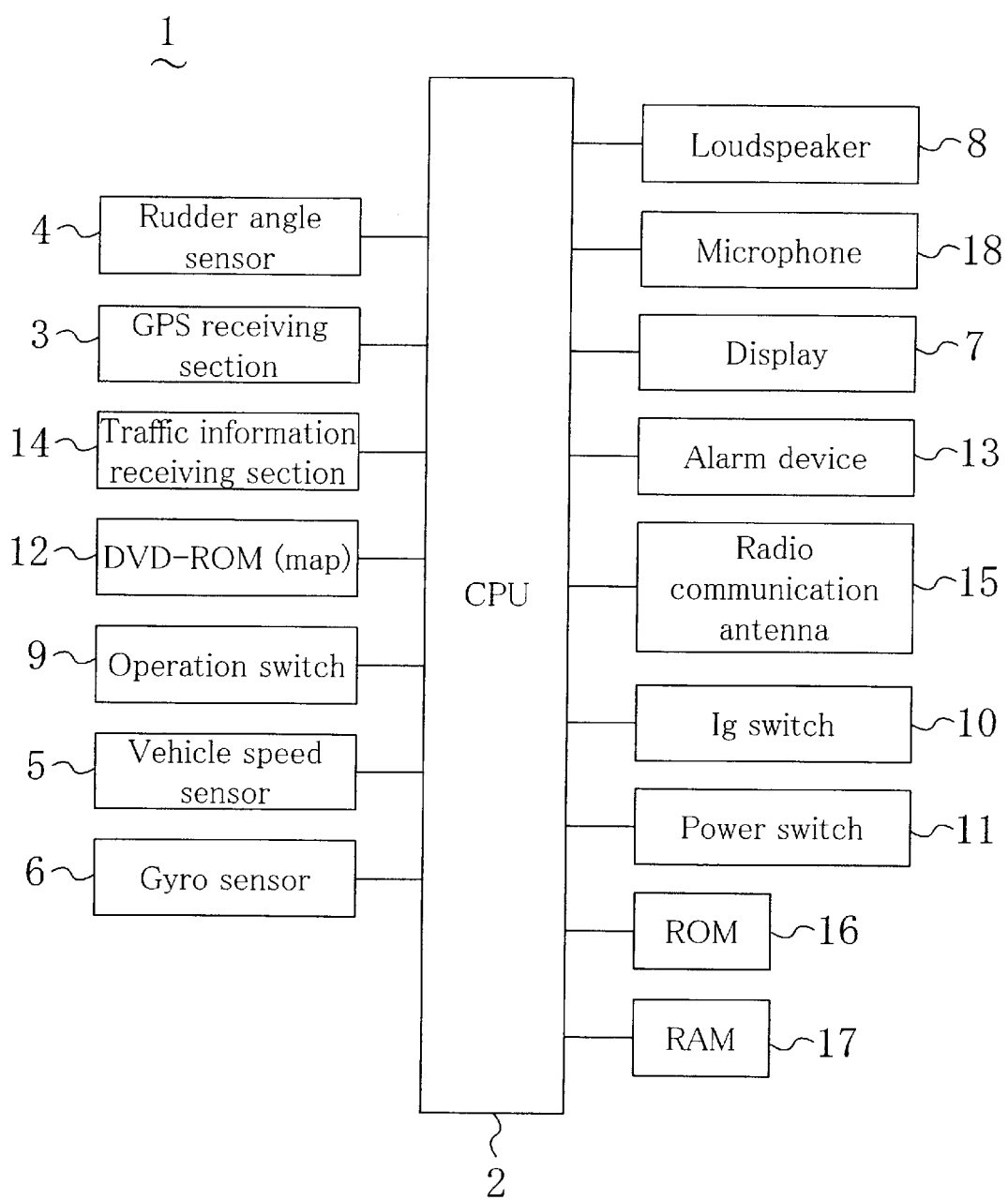
FIG. 5 is a block diagram illustrating a configuration of an on-vehicle navigation device.

As illustrated in FIG. 5, the navigation device 1 includes a CPU 2 for processing various signals. At least the following devices are connected to the CPU 2 so that signals can be exchanged between the devices and the CPU 2: a GPS receiving section 3 for receiving a GPS signal from a GPS satellite; a rudder angle sensor 4 for detecting the rudder angle of the steering wheel of the vehicle V; a vehicle speed sensor 5 for detecting the travel speed of the vehicle V; a gyro sensor 6 for detecting the orientation of the vehicle V; a display 7 for displaying various information on a screen; a loudspeaker 8 for reporting various information via voice, playing music, etc.; an operation switch 9, including a joystick switch, a trackball switch, etc., for selecting icons displayed on the screen of the display 7; an ignition switch 10 for enabling driving of the vehicle V; a power switch 11 for turning ON/OFF the navigation device 1; a DVD-ROM drive 12 for driving a DVD-ROM storing maps; an alarm device 13 for giving various alarms; a traffic information receiving section 14 for receiving traffic information from the traffic information center TC; a communication antenna 15 for transmitting/receiving data signals to/from the radio communication antenna 31, which is connected to the server 30 of the information center MC and the personal computers 20; a ROM 16 for storing a PIM (Personal Information Manager) program, a navigation program, etc.; a nonvolatile RAM 17 for storing various data; and a microphone 18 for inputting information via voice. The navigation device 1 has a function of detecting the current position of the vehicle V based on the GPS signal from the GPS satellite, the rudder angle of the steering wheel of the vehicle V, the travel speed of the vehicle V, the orientation of the vehicle V, etc. The alarm device 13 may give an alarm as follows. For example, while guiding the user using the vehicle V along the travel route based on the PIM data and the traffic information, if it is expected that the vehicle V will not arrive at the scheduled position by the scheduled time, the alarm device 13 may warn the user (the driver/passenger of the vehicle V) of the possibility of being late.

Figure 6:
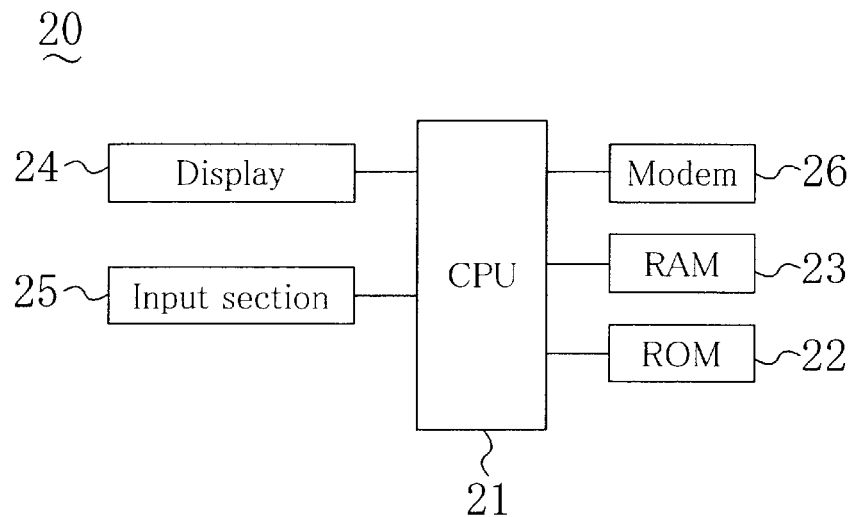
FIG. 6 is a block diagram illustrating a configuration of a personal computer.

On the other hand, as illustrated in FIG. 6, the personal computer 20 includes a CPU 21 for processing various signals. As in the navigation device 1, a ROM 22 for storing a PIM program, etc., a RAM 23, a display 24, an input section 25 such as a keyboard and a mouse, and a modem 26 connected to the communication line 28, are connected to the CPU 21. The personal computer 20 is used as "setting means" and "data inputting means" of the present invention.

Personal information manager data (PIM data), including position data (more specifically, position coordinate data) and time data associated therewith, is input and set/stored through the personal computer 20.

Figure 7:
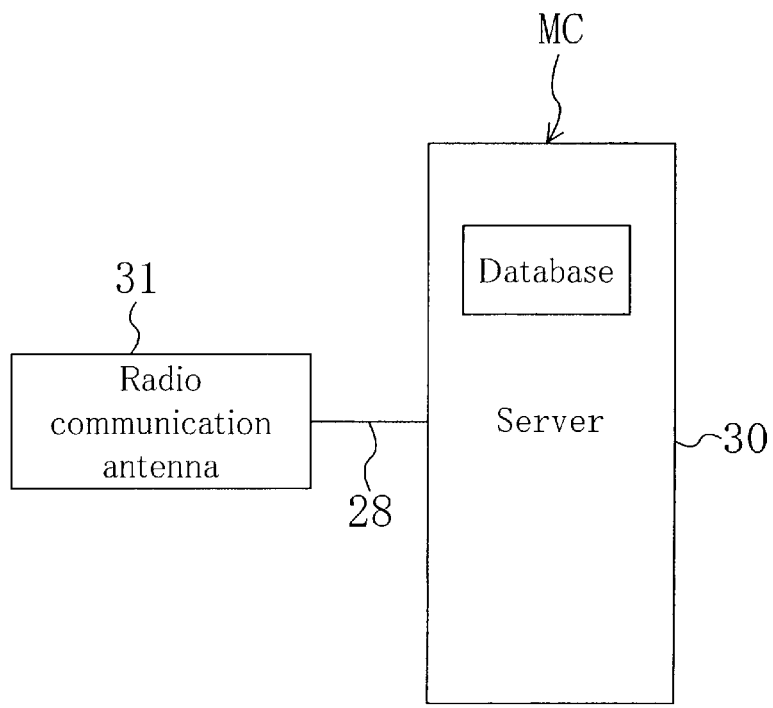
FIG. 7 is a block diagram illustrating a configuration of an information center.
Figure 8:
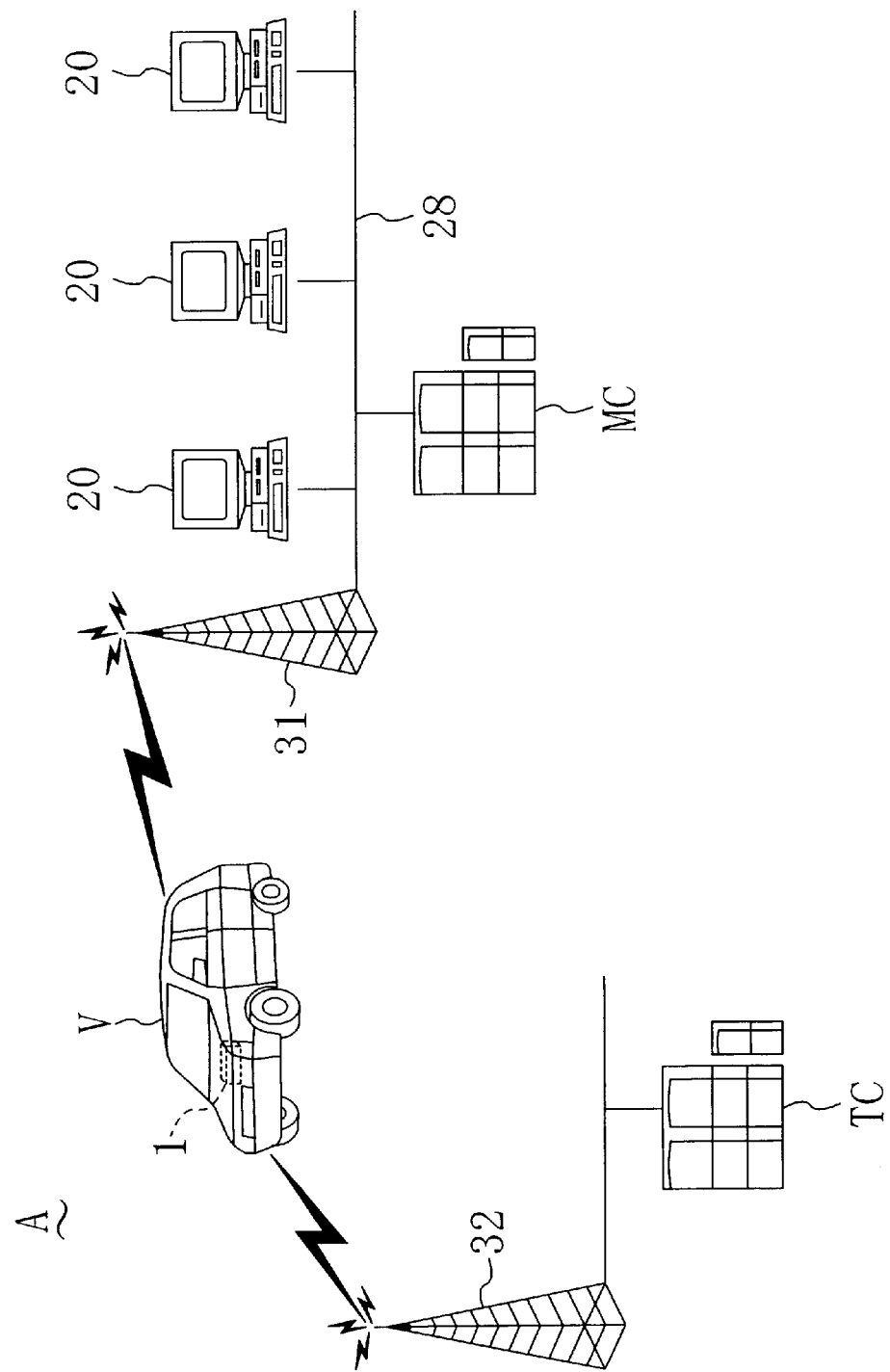
FIG. 8 is a diagram illustrating a general configuration of a mobile information processing system according to an embodiment of the present invention.

Moreover, as illustrated in FIG. 7, the server 30 of the information center MC is provided with a database storing various information provided thereto.

Figure 4:
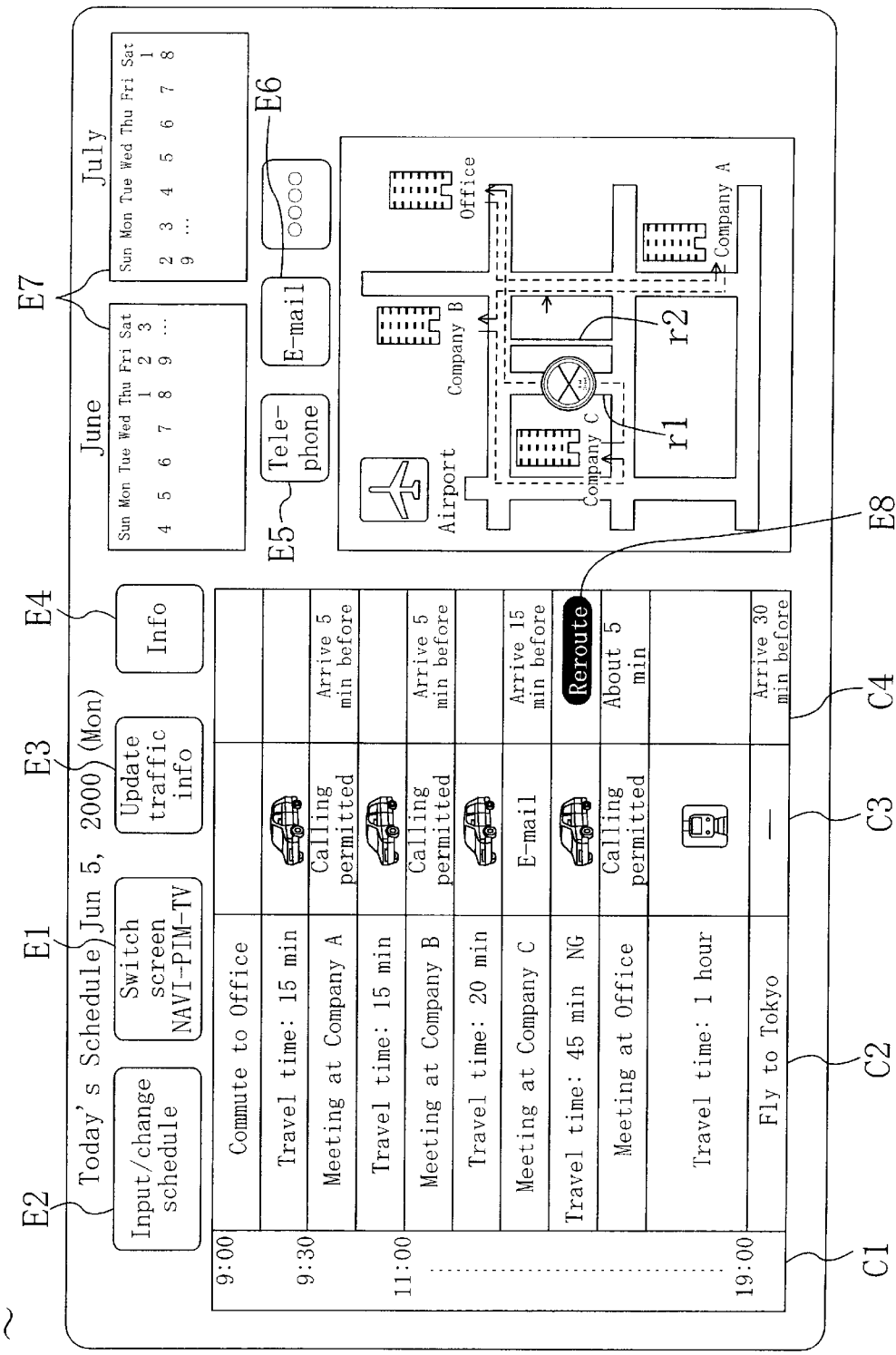
FIG. 4 is a diagram illustrating a PIM mode screen displayed on a display.

A signal processing operation performed by the CPU 2 of the navigation device 1 for navigation control will be described with reference to FIG. 1 and FIG. 2. The signal processing operation is performed when the control mode is set to a navigation mode or a PIM mode. The control mode can be set to the navigation mode or the PIM mode by selecting and pushing, with the operation switch 9, a screen switching icon E1 displayed on the screen of the display 7, as illustrated in FIG. 4. Specifically, by selecting and pushing, with the operation switch 9, the screen switching icon E1 displayed on the screen of the display 7, the screen of the display 7 is switched from one to another among the navigation mode screen, PIM mode screen and the TV mode screen. By switching the screen to the PIM mode screen, PIM data associated with the current navigation control is selected and reported.

In the initial step S1 of the signal processing operation, it is determined whether the PIM mode has been selected by the operation switch 9. If the determination returns NO, indicating that the navigation mode has been set, the process proceeds to step S2 to perform a normal navigation control operation and then return. Specifically, the display 7 is switched to the navigation mode screen, after which a map and the current position of the vehicle V, which is detected based on the GPS signal, the vehicle speed signal, the gyro signal, etc., are displayed so as to guide the vehicle V along the travel route.

If the determination in step S1 returns YES, indicating that the PIM mode has been set, the process proceeds to step S3 to determine whether the PIM data, which has been input and set/stored through the personal computer 20, has been input to the RAM 17 of the navigation device 1 through signal exchange with the information center MC. If the determination returns NO, the process directly returns, whereas if the determination returns YES, the process proceeds to step S4, where the display 7 is switched to the PIM mode screen. As illustrated in FIG. 4 by way of example, the PIM mode screen contains a time field C1, a schedule item field C2, a transportation field C3 and a remarks field C4 for showing the schedule of the day based on the PIM data. Specifically, for example, the schedule item field C2 may display an expected travel time t3 in addition to schedule items, the transportation field C3 may display the form of notification to be described later in addition to the transportation, and the remarks field C4 may display the status of arrival at the scheduled position. Moreover, a navigation map related to the schedule is displayed on the lower right side of the screen. In addition to the screen switching icon E1, the screen contains a schedule input/change icon E2, a traffic update icon E3 for manually updating the traffic information by receiving traffic information from the traffic information center TC, an information icon E4 for displaying various information, a telephone icon E5 for making a telephone call, a mail icon E6 for transmitting/receiving e-mail, a calendar icon E7, etc. By operating the switch to select and push the traffic update icon E3, the user can manually cause the navigation device 1 to update the traffic information by receiving traffic information from the traffic information center TC.

In the exemplary schedule illustrated above, it is assumed that the user is scheduled to commute from home to the office, travel by the vehicle V to Company A, Company B and Company C in this order to attend meetings, come back from Company C to the office and go to an airport by train to go to Tokyo by airplane.

After step S4, the process proceeds to step S5 to determine whether a predetermined time period (e.g., 10 minutes) has elapsed based on, for example, an internal timer that repeatedly counts up to the predetermined time period. If the determination returns NO, the process proceeds directly to step S7. If the predetermined time has passed and thus the determination returns YES, the process proceeds to step S6, where traffic information is received from the traffic information center TC to update the previous traffic information to the new traffic information, after which the process proceeds to step S7.

In step S7, an extra time t is calculated. The extra time t represents an amount of time that would remain before the scheduled time (e.g., 11 a.m.) of the meeting after traveling from the current position to the scheduled position (e.g., Company B) under the travel conditions expected from the traffic information. Specifically, the extra time t can be calculated by adding a margin time t2 (e.g., an amount of time provided for moving from the parking space to the scheduled position) to the scheduled travel time t1, which has been set in the schedule, and then subtracting from the sum the expected travel time t3, which is calculated based on the traffic information. For example, where the scheduled travel time t1 is 30 minutes, the margin time t2 is 5 minutes, and the expected travel time t3 is 15 minutes, the extra time t is calculated to be 20 (=30+5−15) minutes. When the expected travel time t3 is extended to 25 minutes due to a traffic congestion, etc., the extra time t is 10 (=30+5−25) minutes. The scheduled travel time t1 and the margin time t2 may be manually input by the user.

Then, in step S8, it is determined whether the calculated extra time t is less than a reference time, e.g., 15 minutes (this is merely an example of the reference time, and can be changed to any value other than 15 minutes). If the determination returns NO (i.e., if t 15), it is considered that there is a sufficient amount of time left for the user to arrive at the scheduled position from the current position by the scheduled time, and the process proceeds directly to step S18 shown in FIG. 2.

If the determination in step S8 returns YES (i.e., if t<15), it is considered that there may not be a sufficient amount of time left for the user to arrive at the scheduled position from the current position by the scheduled time under the current travel schedule, whereby the user may be late. In such a case, steps S9 to S17 shown in FIG. 2 are performed in order to address the situation. Specifically, first, in step S9, it is determined whether rerouting is permitted. Rerouting is a process of changing the originally-scheduled travel route along which the user is to travel by using the vehicle V. The rerouting may be permitted by selecting and pushing a rerouting icon E8 displayed in the remarks field C4 of the schedule in the PIM mode screen shown in FIG. 4.

If the determination in step S9 returns NO (i.e., if rerouting is not permitted), the process proceeds to step S16 to notify the user that the user may not be able to arrive at the next scheduled position in time under the current travel schedule (note that it is possible to change the setting so that no such notification is given). The notification may be given either via calling by voice or via e-mail. Specifically, the notification via calling by voice or via e-mail may be given through, for example, a portable phone carried by the user. Whether the notification is given via voice or e-mail is pre-set by the user. For example, calling by voice may be selected in cases where a notification via voice is acceptable during a meeting, or the notification via e-mail may be selected in cases where a notification via voice should be avoided. The selected form of notification is displayed in the transportation field C3 of the schedule in the PIM mode screen shown in FIG. 4.

If the determination in step S9 returns YES (i.e., if rerouting is permitted), a new travel route such that the extra time t is equal to or greater than 15 minutes is searched for in step S10, and it is determined in the next step, step S11, whether such a travel route (an alternative route) is available. For example, if the traffic information indicates that there is a closed section along a road r1 included in the original travel route, as shown in the map on the PIM mode screen shown in FIG. 4, while the user is returning from Company C to the office, an alternative travel route is searched for such that a road r2 (a detour around the closed road r1) is included. If the determination returns YES (i.e., if an alternative travel route is available), the process proceeds to S12 to store the change of the original travel route to the new travel route, after which the process proceeds to step S18. Thus, in such a case, a notification to the user in step S16 to be described later is not given.

If the determination in step S11 returns NO (i.e., if no alternative travel route is available), the process proceeds to step S13 to determine whether change of transportation is permitted. Change of transportation is a process of changing the transportation from the vehicle V to another transportation for traveling to the scheduled position. The change of transportation may be permitted similarly by selecting and pushing a change transportation icon (not shown) displayed in the remarks field C4 of the schedule in the PIM mode screen shown in FIG. 4. If the determination returns NO (i.e., if change of transportation is not permitted), the process proceeds to step S16 to notify the user, either via calling by voice or via e-mail, that the user may be late.

The determination returns YES (i.e., if change of transportation is permitted), a new transportation such that the extra time t is equal to or greater than 15 minutes is searched for in step S14, and it is determined in the next step, step S15, whether such an alternative transportation is available. If the determination returns NO (i.e., if no such alternative transportation is available), the process proceeds to step S16 to notify the user that the user may be late either via calling by voice or via e-mail.

If the determination in step S15 returns YES (i.e., if an alternative transportation is available), the process proceeds to step S17 to notify the user that the transportation has been changed to the alternative transportation and store a new route using the alternative transportation, after which the process proceeds to step S20.

In step S18, it is determined whether the vehicle V has started moving. If the vehicle V has not started moving, the process returns. If the determination in step S18 returns YES (i.e., if the vehicle V has started moving), the process proceeds to step S19 to display the current position of the vehicle V on the map in the PIM mode screen of the display 7 and start guiding the vehicle V along the travel route to the next scheduled position. Then, in step S20, an automatic check-off subroutine is executed to transmit, to the personal computer 20 via the information center MC, information indicating that one schedule item has been completed and the PIM data has been updated, or that the travel route of the vehicle V or the transportation has been changed. Then, in step S21, the update of the PIM data is confirmed, and then the process returns.

A signal processing operation for automatically checking off a PIM data item in the automatic check-off subroutine of step S20 will be described with reference to FIG. 3. In the initial step, step S31, it is determined whether a PIM data item exists in the RAM 17 of the navigation device 1. If the determination returns NO, step S31 is repeated. If the determination returns YES, the process proceeds to step S32 to determine whether the current position of the vehicle V is in the vicinity of the position data of the stored PIM data item and the current time is in the same time period as the scheduled time of the PIM data item. If the determination returns NO, the process ends. If the determination returns YES, it is then determined in step S33 whether the vehicle V is in a halt state (i.e., whether the mobile object has not moved for a certain period of time). If the determination returns NO (i.e., if the vehicle V is not in a halt state), the process ends. If the determination returns YES (i.e., if the vehicle V is in a halt state), it is determined that the vehicle V is in a halt state as the user is out of the vehicle V for an appointment, e.g., a meeting, set in the PIM data item, and the process proceeds to step S34 to determine whether there has been confirmation of guidance for the PIM data item of the appointment related to the halt state among other PIM data items. The confirmation of guidance may be done by displaying a menu screen on the display 7, for example. If the determination in step S34 returns NO (i.e., if there has been no confirmation of guidance), the process ends. If the determination returns YES, the process proceeds to step S35 to check off the PIM data item, indicating that the scheduled appointment related to the halt state has been completed, and then to step S36 to transmit, to the personal computer 20 outside the vehicle V via the information center MC, the traveling status data of the vehicle V and time data associated therewith, after which the process ends. Then, in the personal computer 20, the stored PIM data is automatically updated by receiving the traveling status data and the time data from the navigation device 1.

Figure 2:
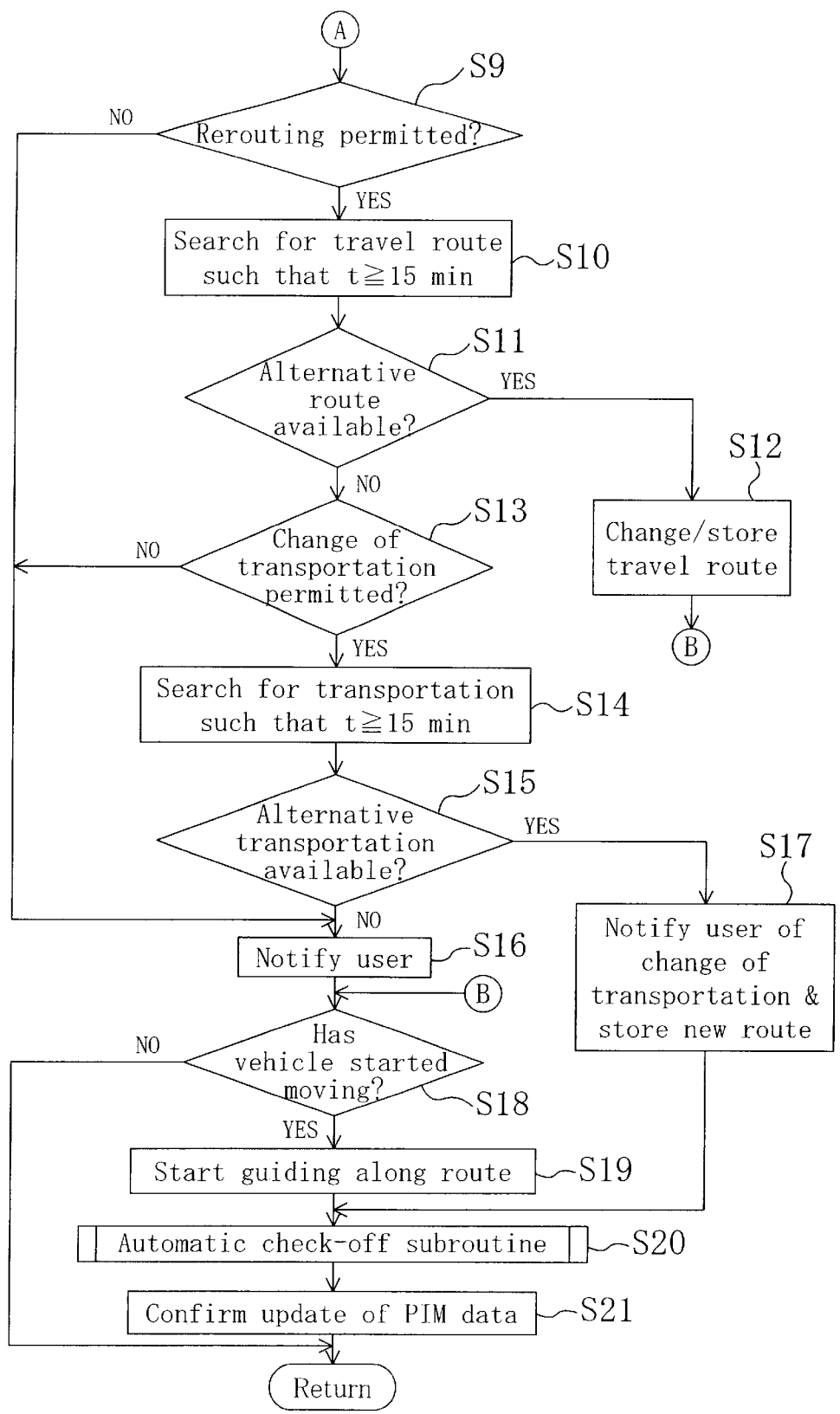
FIG. 2 is a flow chart illustrating the latter half of the signal processing operation which is performed for navigation control.

In the present embodiment, through steps S4 to S21 shown in FIG. 1 and FIG. 2, the navigation device 1 receives traffic information from the traffic information center TC outside the vehicle v so as to guide the user using the vehicle V along the travel route based on the PIM data set/stored by the personal computer 20 (setting means) in association with the position data thereof.

Through steps S7, S8 and S16, the navigation device 1 sets the extra time t based on the time data and the position data, which have been set through the personal computer 20, and the traffic information, and determines whether the user using the vehicle V can arrive at the scheduled position in the PIM data by the scheduled time with the extra time t. If it is determined timely arrival is not possible, the navigation device 1 gives a predetermined notification to the user either via calling by voice or via e-mail.

Through steps S9 to S15 and S17, if it is determined that the user using the vehicle V cannot arrive at the scheduled position by the scheduled time, the navigation device 1 sets an alternative travel schedule by changing the travel route of the vehicle V to another or by changing the vehicle V to another transportation.

Through steps S5 and S6, the navigation device 1 periodically updates the traffic information by receiving traffic information from the traffic information center TC at regular intervals of a predetermined time period. Thus, step S6 provides traffic information receiving means for receiving traffic information.

Step S8 provides determination means for determining, based on the position data and the time data which have been input, the detected current position of the vehicle V, and the received traffic information, whether the vehicle V can arrive at a position corresponding to the position data by a time corresponding to the time data in view of the traffic information. Step S16 provides notification means for giving a predetermined notification when the determination means determines that timely arrival is not possible.

Figure 3:
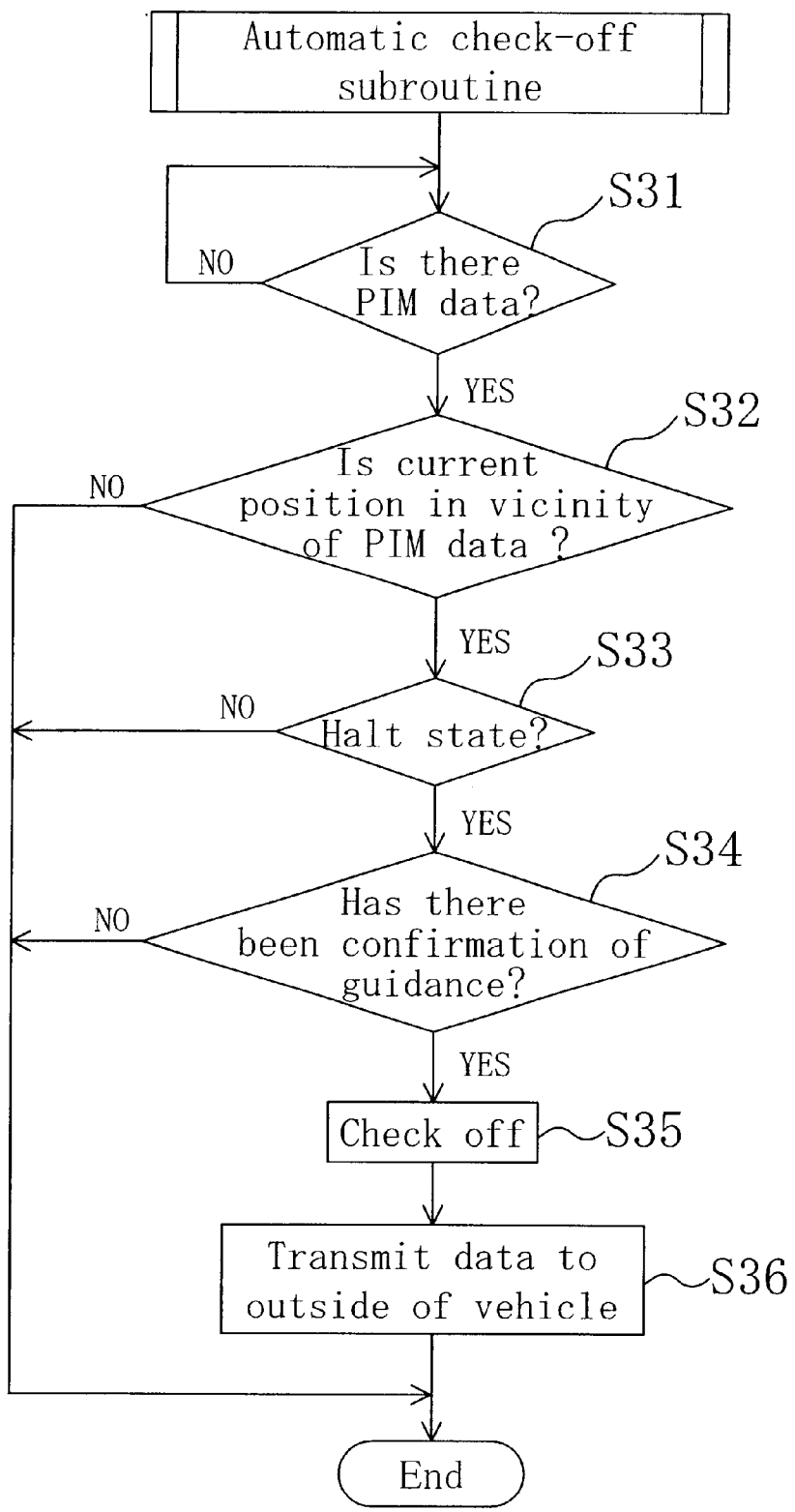
FIG. 3 is a flow chart illustrating a signal processing operation of an automatic check-off subroutine for automatically checking off a PIM data item.

Through steps S32, S35 and S36 shown in FIG. 3, the navigation device 1 guides the user using the vehicle V along the travel route and transmits the traveling status data and the time data associated therewith to the personal computer 20 via the information center MC. Then, the personal computer 20 automatically updates the original PIM data based on the traveling status data and the time data transmitted from the navigation device 1 in the vehicle V.

Through steps S31, S33 and S34, the navigation device 1 receives PIM data from the personal computer 20, and while the vehicle V is in a halt state, the navigation device 1 confirms whether or not to update/store the PIM data item corresponding to the halt state (confirmation of guidance).

Next, the function of the present embodiment will be described. In the personal computer 20, PIM data, including the position data and the time data associated therewith, is input and set/stored. The PIM data is input to the RAM 17 of the navigation device 1 of the vehicle V from the personal computer 20 via the information center MC. When the control mode of the navigation device 1 is the PIM mode, the PIM mode screen is displayed on the display 7, and the traffic information is periodically updated by receiving traffic information from the traffic information center TC at regular intervals of a predetermined time period (e.g., 10 minutes). The extra time t is calculated by adding the margin time t2 to the scheduled travel time t1 according to the schedule of the set PIM data, and then subtracting from the sum the expected travel time t3, which is calculated based on the traffic information. If the extra time t is equal to or greater than 15 minutes, for example, there is a sufficient amount of time left for the user to travel from the current position to the scheduled position by the scheduled time. In such a case, after the vehicle V starts moving, a map and the current position of the vehicle V are displayed on the PIM mode screen of the display 7, and the operation of guiding the vehicle V to the next scheduled position along the travel route is started.

In this operation, since the traffic information is updated by receiving traffic information from the traffic information center TC at regular intervals of a predetermined time period, the latest traffic information is periodically received, and it is possible to perform navigation control according to the PIM data with a good precision.

When the screen switching icon E1 displayed on the screen of the display 7 is selected and pushed by using the operation switch 9, the screen of the display 7 is switched from the navigation mode screen or the TV mode screen to the PIM mode screen, and the PIM data item associated with the current navigation control operation is selected and reported. Thus, the user can easily know about the PIM data item associated with the current navigation control operation through a simple switch operation, thereby improving the convenience for the user.

On the other hand, if the extra time t is less than 15 minutes, there is a possibility that the user might be late because there is not a sufficient amount of time left under the current traveling schedule for the user to travel from the current position to the scheduled position by the scheduled time. In such a case, it is determined whether rerouting is permitted. If rerouting is permitted, an alternative travel route such that the extra time t is equal to or greater than 15 minutes is searched for. If such an alternative travel route is available, the original travel route is changed to the alternative travel route, and the operation of guiding the vehicle V to the next scheduled position along the travel route is started based on the changed travel route.

If the search does not yield any alternative travel route such that the extra time t is equal to or greater than 15 minutes, it is then determined whether change of transportation is permitted. If change of transportation is permitted, an alternative transportation such that the extra time t is equal to or greater than 15 minutes is searched for. If such an alternative transportation is found, the current transportation is changed to the alternative transportation, and the change to the alternative transportation is notified to the user.

If rerouting or change of transportation is not permitted, or if no alternative travel route or transportation such that the extra time t is equal to or greater than 15 minutes is available, the user is notified, either via calling by voice or via e-mail, that the user may be late for the next scheduled position under the current traveling schedule.

As described above, based on the time data and the position data of the PIM data and the traffic information, it is determined whether the user using the vehicle V can arrive at the scheduled position by the scheduled time with the extra time t, e.g., 15 minutes or more, and if it is determined that timely arrival is not possible even with an alternative travel route or an alternative transportation, the user is notified of the determination. In this way, the user can know, in advance, that there is a possibility that the user might not be able to arrive at the scheduled position by the scheduled time with the extra time t, thereby making it easier for the user to address the situation.

The extra time t is calculated by adding the margin time t2 to the scheduled travel time t1 according to the schedule of the PIM data, and then subtracting from the sum the expected travel time t3, which is calculated based on the traffic information. Thus, when determining whether the user using the vehicle V can arrive at the scheduled position by the scheduled time, the extra time t is set (i.e., the extra time t is taken into account). In this way, when timely arrival at the scheduled position is not possible, the user is given the extra time t for addressing the situation.

The notification to the user is given either via calling by voice or via e-mail, and the user can suitably select calling by voice or e-mail depending upon the circumstances, thereby improving the convenience for the user.

If it is determined that the user using the vehicle V cannot arrive at the scheduled position corresponding to the PIM data with the extra time t, the travel schedule is automatically changed to an alternative travel schedule by changing the travel route of the vehicle V to another or by changing the vehicle V to another transportation. If it is determined that timely arrival is not possible even with the alternative travel schedule, the user is notified of the determination. This increases the possibility that the user can arrive at the scheduled position by the scheduled time by using an alternative travel schedule, thereby improving the convenience for the user.

Then, information indicating that one schedule item has been completed and the PIM data has been updated, or that the travel route of the vehicle V or the transportation has been changed, is transmitted to the personal computer 20 via the server of the information center MC. Specifically, when the vehicle V is in a halt state with the current position of the vehicle V being in the vicinity of the position data of the PIM data item and the current time being in the same time period as the scheduled time of the PIM data item, and when there has been confirmation of guidance for the PIM data item of the appointment related to the halt state among other PIM data items, the PIM data item is checked off, indicating that the scheduled appointment related to the halt state has been completed, and the traveling status data and the time data associated therewith are transmitted to the personal computer 20 outside the vehicle V via the information center MC. The personal computer 20 receives the traveling status data and the time data from the navigation device 1 to automatically update the PIM data stored therein.

Thus, the present embodiment employs the navigation device 1 for guiding the user using the vehicle V along the travel route based on the traffic information received from outside the vehicle V and the PIM data set/stored in the personal computer 20 and in association with the position data of the PIM data. Therefore, it is possible to appropriately guide the user using the vehicle V along the travel route according to the position data of the PIM data, thereby improving the convenience for the user.

Moreover, the PIM data is input and set/stored through the personal computer 20 outside the vehicle V, and the PIM data set through the personal computer 20 is transmitted to the navigation device 1 in the vehicle V via the information center MC. Therefore, it is not necessary, in the vehicle V, to input and set the PIM data, and it is only necessary to provide the navigation device 1 in the vehicle V, thereby simplifying the configuration of the system on the vehicle V side.

Moreover, the traveling status data of the user using the vehicle V and the time data associated therewith are transmitted from the on-vehicle navigation device 1 back to the personal computer 20, in which the PIM data is automatically updated based on the received traveling status data of the user and the time data. Thus, the PIM data is successively updated on the personal computer 20 side according to the actual traveling status of the user. As a result, the PIM data is appropriately updated, thereby improving the convenience for the user.

After the vehicle V comes to a halt, it is confirmed whether the user wishes to update/store the corresponding PIM data item, and the PIM data is updated/stored only when it is confirmed by the user. Therefore, it is possible to selectively update only the necessary data items of the PIM data, thereby improving the convenience for the user.

Alternative Embodiments

In the embodiment described above, the PIM data, which has been set through the personal computer 20 outside the vehicle V, is transmitted to the navigation device 1 of the vehicle V via the information center MC so that the navigation device 1 performs a navigation control operation according to the PIM data, while the traveling status data of the user guided by the navigation device 1 is returned to the personal computer 20 so that the PIM data is updated in the personal computer 20. Alternatively, setting means for inputting and setting/storing the PIM data may be provided in the vehicle V in combination with the navigation device 1. In such a case, the position data of the PIM data can be input by using the map information of the navigation device 1.

Moreover, in the embodiment described above, the PIM program is stored in both the navigation device 1 and the personal computer 20. Alternatively, the PIM program may not be stored in the navigation device 1 so that the navigation device 1 functions only as a server.

Alternatively, the navigation program may be stored also in the personal computer 20, in which case the travel route of the user may be input/set through the personal computer 20, and the travel route data set through the personal computer 20 may also be transmitted to the navigation device 1 of the vehicle V along with the PIM data. In this way, the on-vehicle navigation device 1 no longer needs the function of setting the travel route of the user using the vehicle V, and only needs the function of guiding the vehicle V along the travel route, thereby simplifying the on-vehicle navigation device 1.

After the traveling status data of the vehicle V and the time data associated therewith are transmitted from the navigation device 1 to the personal computer 20 outside the vehicle V via the information center MC in order to update the PIM data, as in the embodiment described above, the user may be inquired as to whether there has arisen (as a result of the meeting, etc., in the current travel) a next appointment at the same scheduled position, where the vehicle V has been in a halt state. If there has arisen such a next appointment, the user is allowed to input the date and time of the next appointment so that the scheduled position and the scheduled date and time may be transmitted to the personal computer 20 outside the vehicle V as a PIM data item. This makes easier the PIM data setting operation for that date.

Moreover, in the embodiment described above, the user travels by means of the vehicle V. However, the present invention can also be used in other cases where the user travels by means of transportations other than the vehicle V, e.g., taxis, buses, trains, etc. Furthermore, the present invention can also be used in cases where the user travels carrying a portable phone with a navigation function, or the like, and cases where the PIM data is used for other purposes, e.g., managing the operation of taxis, buses, etc.

What is claimed is:

1. A mobile information proceeding system, comprising:
   a computer for setting personal information manager data including position data in association with time data; and
   a navigation device for receiving traffic information and guiding a mobile object along a travel route,
   wherein the navigation device is configured so as to guide the mobile object along the travel route based on the time data and the position data of the personal information manager data which has been set through the computer and the traffic information and in association with the position data, to determine whether the mobile object can arrive at a scheduled position by a scheduled time, and to give a predetermined notification either via calling by voice or via e-mail when it is determined that timely arrival is not possible.

2. A mobile information processing system, comprising:
   a computer for setting the personal information manager data including position data in association with the time data; and
   a navigation device for receiving traffic information and guiding a mobile object along a travel route,
   wherein the navigation device is configured so as to guide the mobile object along the travel route based on the time data and the position data of the personal information manager data which has been set through the computer and the traffic information and in association with the position data, to determine whether the mobile object can arrive at a scheduled position by a scheduled time, and to give a predetermined notification via a portable terminal carried by a user of the mobile object when it is determined that timely arrival is not possible.

3. A mobile information processing system of claim 1 or 2, wherein the navigation device is configured so as to set a predetermined extra time when determining whether the mobile object can arrive at the scheduled position by the scheduled time.

4. A mobile information processing system of claim 1 or 2, wherein the navigation device is configured so as to update the traffic information by receiving current traffic information in response to a switch operation.

5. A mobile information processing system of claim 1 or 2, wherein the navigation device is configured to set an alternative travel schedule when it is determined that the mobile object cannot arrive at the scheduled position by the scheduled time.

6. A mobile information processing system of claim 1 or 2, wherein the computer is provided outside the mobile object and is configured so as to transmit the personal information manager data which has been set through the computer to the navigation device.

7. A mobile information processing system of claim 6, wherein the computer is configured so as to set a travel route of the mobile object and to transmit data of the travel route to the navigation device.

8. A mobile information processing system of claim 1 or 2, wherein the navigation device is configured so that an item of the personal information manager data associated with a current navigation control operation is selected and reported by a predetermined switch operation.

9. A mobile information processing system of claim 1 or 2, wherein the navigation device is configured so as to update the traffic information stored therein by receiving current traffic information at regular intervals of a predetermined time period.

10. A storage medium for storing a program for controlling a computer, the storage medium storing a mobile information processing program for guiding a mobile object along a travel route based on personal information manager data including position data and time data which have been input in advance, and received traffic information and in association with the position data, and determining whether the mobile object can arrive at a position corresponding to the position data by a time corresponding to the time data in view of a detected current position of the mobile object and the traffic information, and giving a predetermined notification either via calling by voice or via e-mail when it is determined that timely arrival is not possible.

11. A storage medium for storing a program for controlling a computer, the storage medium storing a mobile information processing program for guiding a mobile object along a travel route based on personal information manager data including position data and time data which have been input in advance, and received traffic information and in association with the position data, and determining whether the mobile object can arrive at a position corresponding to the position data by a time corresponding to the time data in view of a detected current position of the mobile object and the traffic information, and giving a predetermined notification via a potable terminal carried by a user of the mobile object when it is determined that timely arrival is not possible.

* * * * *